United States Patent
Ogihara

[11] Patent Number: 5,173,816
[45] Date of Patent: Dec. 22, 1992

[54] DISK DRIVE WITH AUTOMATIC DISK TYPE AND DISK INSERTION DETECTION

[75] Inventor: Koichiro Ogihara, Tokyo, Japan

[73] Assignee: Sony Corporation, Tokyo, Japan

[21] Appl. No.: 619,894

[22] Filed: Nov. 28, 1990

[30] Foreign Application Priority Data

Nov. 30, 1989 [JP] Japan .................................. 1-311698

[51] Int. Cl.$^5$ .............................................. G11B 5/02
[52] U.S. Cl. ...................................... 360/69; 360/133
[58] Field of Search ........................ 360/69, 133, 60; 369/291

[56] References Cited

U.S. PATENT DOCUMENTS

| | | | |
|---|---|---|---|
| 4,837,758 | 6/1989 | Motoyama et al. | 360/133 X |
| 4,843,490 | 6/1989 | Hasagushi | 360/66 X |
| 4,928,193 | 5/1990 | Agoglia et al. | 360/78.08 X |
| 4,995,029 | 2/1991 | Kobayashi et al. | 360/133 X |

Primary Examiner—David J. Severin
Attorney, Agent, or Firm—Philip M. Shaw, Jr.

[57] ABSTRACT

A disc drive unit in which a controller detects the storage capacity of the disc cartridge during loading into the drive by interrogating switches which are actuated by capacity indication markers on the disc cartridge.

3 Claims, 3 Drawing Sheets

DISK DRIVE WITH AUTOMATIC DISK TYPE AND DISK INSERTION DETECTION

BACKGROUND OF THE INVENTION

The present invention relates to a disk drive unit and is suitably applied to a floppy disk drive unit, for example.

Conventional disk drive units include a floppy disk drive in which a floppy disk, having a magnetic disk encased in a disk casing, is placed to write information to or read information from it.

More specifically, in a floppy disk drive unit 1 as illustrated in FIG. 1, a floppy disk 3 is inserted into the disk drive 4 through a disk inlet 5. Simultaneously, the disk detecting switch is turned on to indicate the insertion of the floppy disk 3.

The disk detecting switch is provided within the disk drive 4 and is activated by a bottom surface 3B of a disk casing 3A of the floppy disk 3 when the floppy disk 3 is inserted to a driven position within the disk drive 4. As a result, a signal representing the insertion of the floppy disk 3 is sent to a control unit provided in the disk drive 4. Thus, the disk drive 4 is actuated to drive the floppy disk 3, and at the same time an indication lamp 8 mounted on a front panel 7 is lit to indicate that the disc unit 1 is in operation.

The disk casing 3A of the floppy disk 3 has a write protect mode detection window 3C formed through it. The write protect mode detection window 3C is provided with a slidable closure tab 3D. When the floppy disk 3 is placed in the disk drive 4 with the write protect mode detection window 3C closed with the closure tab 3D, the disk detecting switch 4 is pushed to turn on to send a drive signal to the control unit, so that the disk drive 4 is actuated.

On the other hand, when the closure tab 3D is slid to open the write protect mode detection window 3C, the disk detecting switch is not turned on by placing the floppy disk 3 in the disk drive 4, and hence the disk drive 4 is not actuated and is placed in write protect mode.

In the floppy disk 3, the disk casing 3A has an indicating hole which indicates the storage capacity of the magnetic disk contained in the disk casing 3A.

More specifically, in a 2MB (megabytes) floppy disk 11 as shown in FIG. 2, a 2MB indication hole 11H is formed in a lower right corner 11F of the disk casing 11A parallel to the lower side 11D while a write protect mode detection window 11C is provided in a lower left corner 11B.

When the floppy disk 11 is placed in position in the disk drive 4, a 2MB detection switch which is provided to oppositely face the 2MB indication hole 11 is not pressed, and hence the control unit judges that the floppy disk 11 is a 2MB medium.

In a 4MB floppy disk 12 as shown in FIG. 3, a 4MB indication hole 12H is formed through the disk casing 12A at a position closer to the upper side than the position where the 2MB indication hole 11 of the 2MB floppy disk 11 (FIG. 2) is formed.

Thus, when the floppy disk 12 is placed in position in the floppy disk drive 4, a 4MB detection switch which is provided at a position to oppositely face the 4MB indication hole 12H is not pressed, so that the control unit determines that the floppy disk 12 is a 4MB medium.

The floppy disk 3 has a storage capacity of 1MB and is provided with neither the 4MB detection hole nor the 2MB detection hole. When the floppy disk 3 is placed in the disk drive 4, both 4MB and 2MB detection switches are activated, and thereby the control unit judges that the floppy disk 3 is a 1MB medium.

In the disk drive 4, floppy disks inserted is thus discriminated in storage capacity according to the operation mode of each of the 2MB and the 4MB detection switches.

The disc unit 1 is further provided with a disk detecting switch to detect the insertion of the floppy disk in addition to the storage capacity detection switches and the write protect mode detection switch. These disk switches detect information of floppy disks inserted.

The disc unit 1 is enhanced in operability by reducing in its size. However, the disk switches make the disk drive 4 rather complicated and increase the size of the disk drive 4.

SUMMARY OF THE INVENTION

Accordingly, it is an object of the present invention to provide a disk drive apparatus that uses the same sensors that detect the type of disk cartridge to detect when the disk cartridge is in the insertion position. This simplifies the construction of the disk drive apparatus by eliminating the sensor that, in known disk drives, is used exclusively to detect whether or not the disk is in the insertion position.

In view of this and other objects, according to a first aspect of the present invention, a disk drive for receiving a disk cartridge that can be one of at least three types of disk cartridge is provided. The types of disk cartridge include a first type of disk cartridge that contains a disk having a first storage capacity. This first type of disk cartridge has a first indication portion at a first position. A second type of disk cartridge contains a disk having a second storage capacity. This second type of disk cartridge has a second indication portion at a second position. The second position is different from the first position. A third type of disk cartridge contains a disk having a third storage capacity.

The disk drive comprises a guide that guides the disk cartridge to an insertion position in the disk drive. The disk drive also includes a first detector that detects the first indication portion when the disk cartridge is inserted into the disk drive. The first detector is located in a position corresponding to the first indication portion of the first type of disk cartridge when the disk cartridge is in the insertion position in the disk drive.

The disk drive additionally includes a second detector that detects the second indication portion when the disk cartridge is inserted into the disk drive. The second detector is located in a position corresponding to the second indication portion of the second type of disk cartridge when the disk cartridge is in the insertion position in the disk drive.

Finally, the disk drive includes a disk insertion detector that is responsive to the first detector and the second detector. The disk insertion detector detects when the disk cartridge has been inserted into the insertion position in the disk drive.

According to a second aspect of the invention, a disk drive that receives a disk cartridge that can be one of at least three types of disk cartridge is provided. The types of disk cartridge include a first type of disk cartridge containing a disk having a first storage capacity. This first type of the disc cartridge has a first indication hole at a first position. A second type of disk cartridge contains a disk having a second storage capacity. This second type of disk cartridge has a second indication hole at a second position. The second position is different from the first position. A third type of disk cartridge contains a disk having a third storage capacity. The third type of the disk cartridge has neither an indication hole at the first position nor an indication hole at the second position.

The disk drive has a guide that guides the disk cartridge to an insertion position within the disk drive. The disk drive also has a first detection switch located in a position corresponding to the first indication hole of the first type of disk cartridge when the disk cartridge is in the insertion position in the disk drive. The first detection switch is activated when the disc cartridge is of the second type or of the third type.

The disk drive also has a second detection switch located in a position corresponding to the second indication hole of the second type of disk cartridge when the disk cartridge is in the insertion position in the disk drive. The second detection switch is activated when the disk cartridge is of the first type or of the third type.

Finally, the disk drive has a controller that determines the type of the disk cartridge in response to the first and the second switches. The controller also determines that the disk cartridge is in the insertion position when at least one of the first and second detection switches is activated.

DETAILED DESCRIPTION OF THE PREFERRED EMBODIMENT

Figure 1:
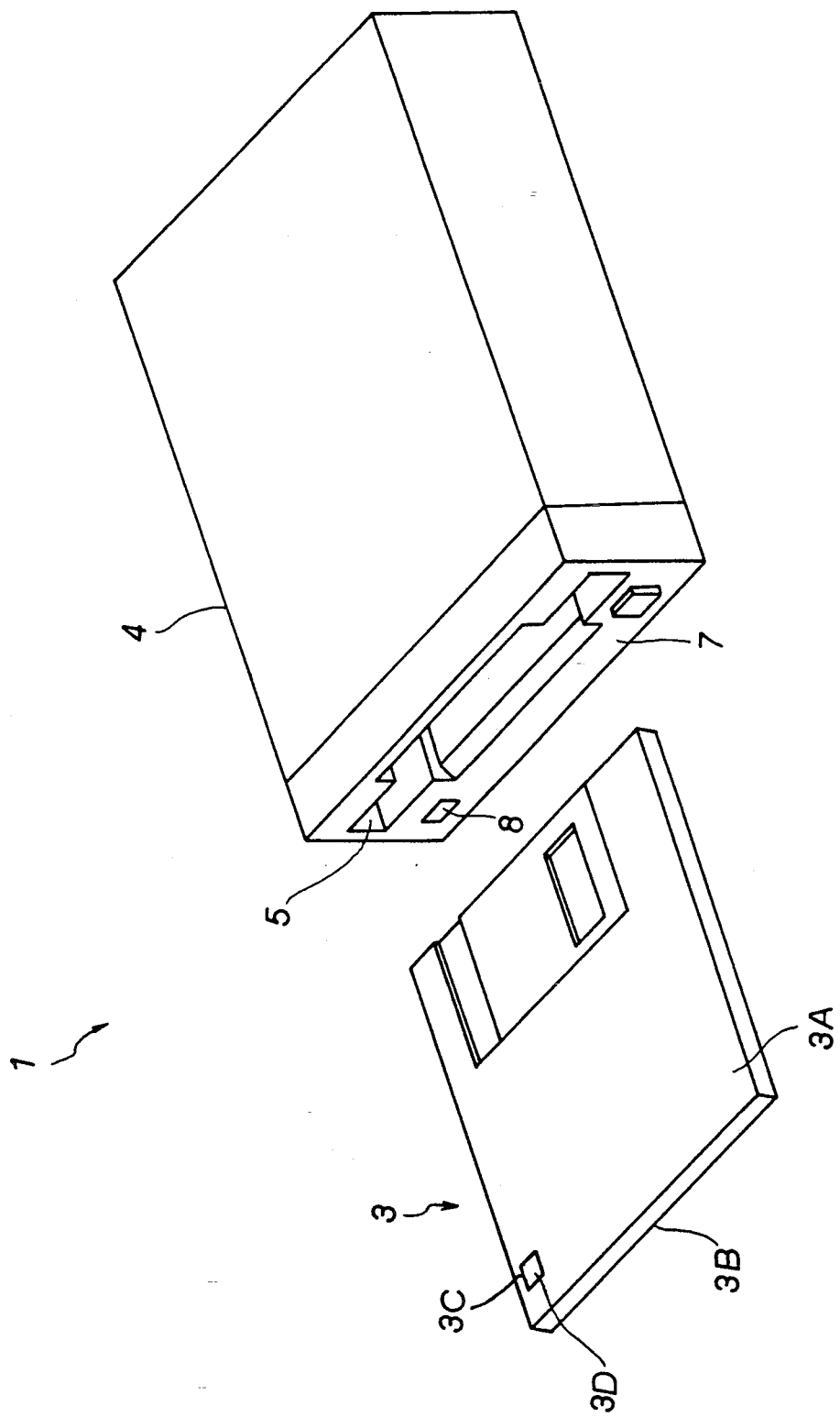
FIG. 1 is a perspective view of the disk drive unit.
Figure 2:
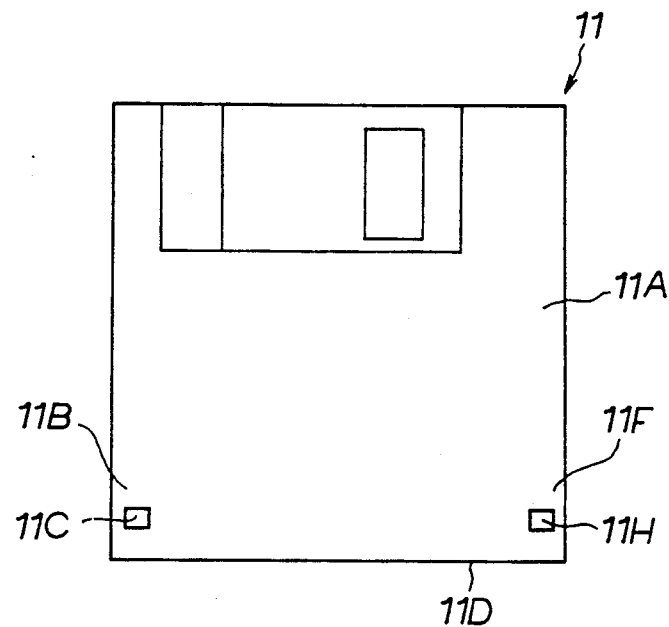
FIG. 2 is a plan view of a 2 MB floppy disk.
Figure 3:
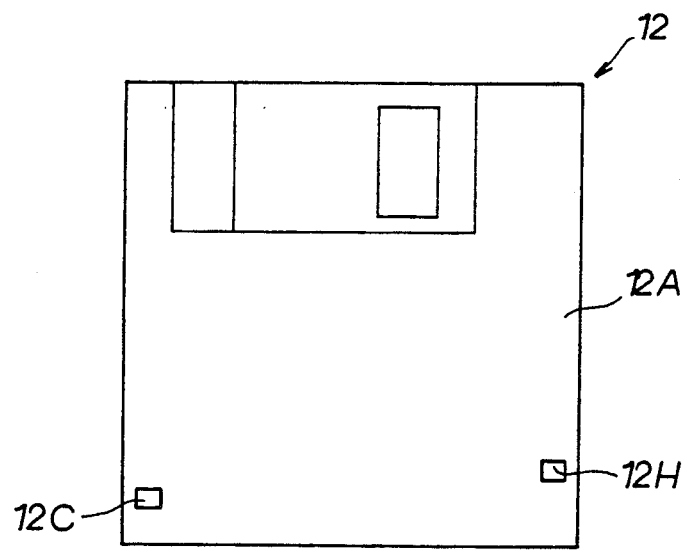
FIG. 3 is a plan view of a 4 MB floppy disk.
Figure 4:
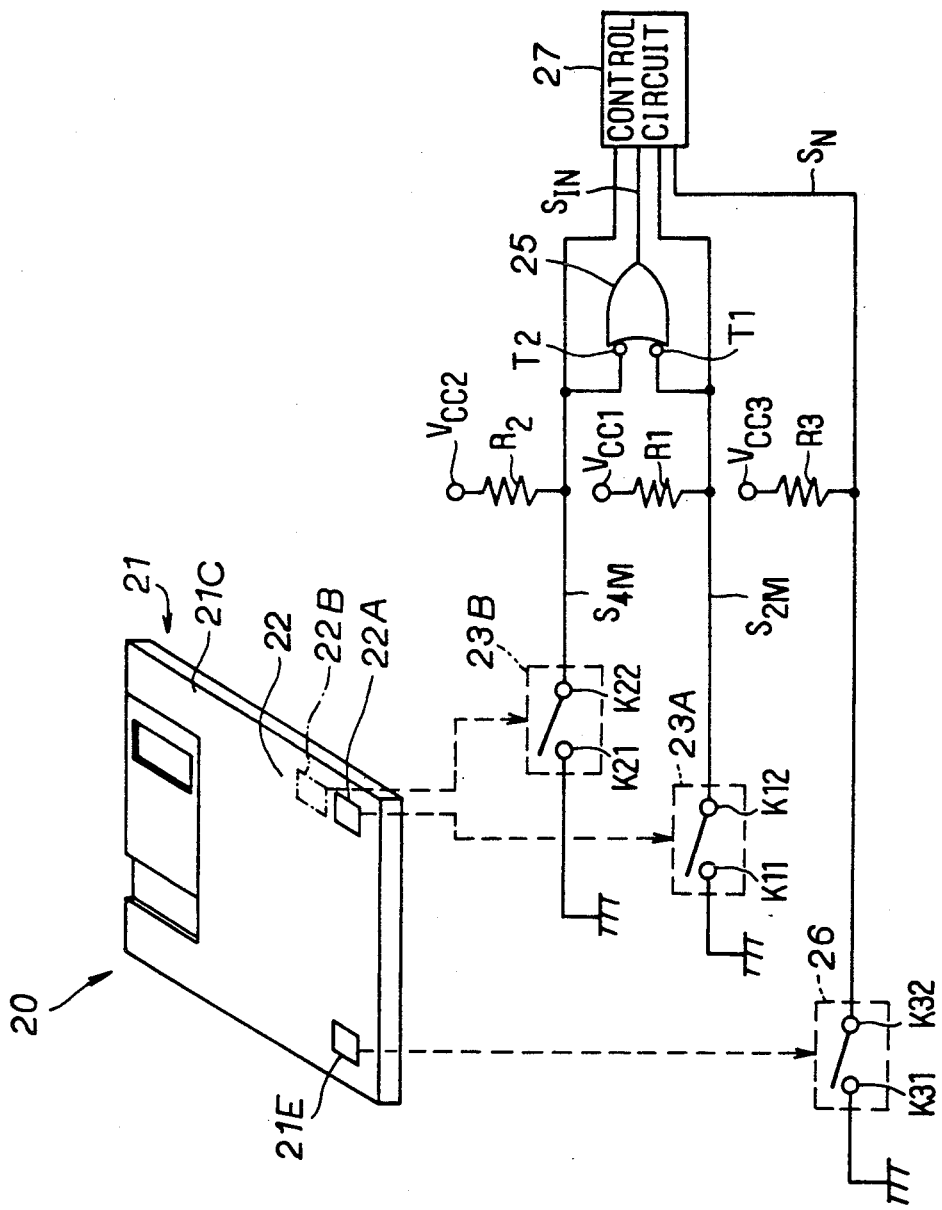
FIG. 4 is a connection diagram of a disk drive unit according to the present invention.

Referring to the drawings, preferred embodiments of the present invention will be described in detail. In FIG. 4, 20 generally designates a disk drive unit which is provided with make-contact type storage capacity detection switches 23A and 23B (shown by the dot-and-dash line). The storage capacity detection switches 23A and 23B are turned on or off according to whether or not the disk casing 21C of a floppy disk 21 has a 2 MB indication hole 22A or a 4 MB indication hole 22B.

The detection switch 23A has one contact K11 grounded and the other contact K12 connected to a power supply $V_{CC1}$ through a resistance R1. The contact K12 is further connected to one inverting input T1 of a NAND gate 25 and to a control circuit 27 as the 2 MB detection signal $S_{2M}$.

In the detection switch 23B, one contact K21 thereof is grounded while the other contact K22 is connected to a power supply $V_{CC2}$ through a resistance R2. The contact K22 is further connected to the inverting input T2 of the NAND gate 25 and to the control circuit 27 as the 4 MB detection signal $S_{4M}$.

When the detection switch 23A turns off, an output from the power supply $V_{CC1}$ causes the 2 MB detection signal $S_{2M}$ to rise to a high logic level. When the detection switch 23A is turned on, the output current from the power supply $V_{CC1}$ flows to ground through the detection switch 23A, so that the 2 MB detection signal $S_{2M}$ falls to a low logic level.

On the other hand, when the detection switch 23B turns off, an output from the power supply $V_{CC2}$ causes the 4 MB detection signal $S_{4M}$ to rise to a high logic level. When the detection switch 23B is turned on, the output current from the power supply $V_{CC2}$ flows to ground through the detection switch 23B, so that the 4 MB detection signal $S_{4M}$ falls to a low logic level.

Thus, whether the storage capacity indication hole 22 is the 4 MB indication hole 22B or the 2 MB indication hole 22A causes the 2 MB detection signal $S_{2M}$ and the 4 MB detection signal $S_{4M}$ to become the high or low logic level.

The disk drive unit 20 is also provided with a make-contact type write protect mode detection switch 26 which turns on or off according to whether or not a closure tab closes a write protect mode detection window 21E provided in the floppy disk 21.

More specifically, one contact K31 of the write protect mode detection switch 26 is grounded whereas the other contact K32 is connected to a power supply $V_{CC3}$ through a resistance R3 and to the control circuit 27.

When the floppy disk 21 is placed in the disk drive with the write protect mode detection window 21E closed, the write protect mode detection switch 26 is pushed by the closure tab to turn on, so that an output current from the power supply $V_{CC3}$ flows to ground through the write protect mode detection switch 26, thereby causing a write protect signal $S_N$ to fall to a low logic level.

According to the write protect signal $S_N$, the control circuit 27 detects that the floppy disk 21 is not in write protect mode and thus controls the drive unit 20 to be in writable state.

On the other hand, when the floppy disk 21 is inserted with the write protect mode detection window 21E open, the movable contact of the write protect mode detection switch 26 fits in the write protect mode detection window 21E, and as result the write protect mode detection switch 26 does not turn on and stay in its off state.

The output of the power supply $V_{CC3}$ thus holds the write protect signal $S_N$ at a high logic level, so that the control circuit 27 maintains the drive unit 20 in write protect mode and prevents the drive unit 20 from being in its writable mode.

Thus, the drive unit 20 is controlled to be the writable or write protect mode according to whether or not the write protect mode detection window 21E is closed.

When the floppy disk 21 placed in the drive unit 20 has a storage capacity of 1 MB, the storage capacity detection switches 23A and 23B are depressed by the disk casing 21C to turn on since the disk casing 21C has no storage capacity indication hole 22. This causes the 2 MB detection signal $S_{2M}$ and the 4 MB detection signal $S_{4M}$ to fall to low logic levels. The control circuit 27 detects the low logic levels and thus judges that the floppy disk 21 is not provided with the storage capacity indication hole 22, that is, the floppy disk 21 is a 1 MB medium.

Simultaneously, the 2 MB detection signal $S_{2M}$ and 4 MB detection signal $S_{4M}$ are inputted to the inverting input T1 and inverting input T2, so that the output signal or disk insertion signal $S_{IN}$ of the NAND gate 25 rises to a high logic level and is then sent to the control circuit 27. According to the disk insertion signal $S_{IN}$, the control circuit 27 detects the insertion of the floppy disk 21 and, as a result, the control circuit 27 starts the drive unit 20 to drive the floppy disk 21.

In the case where the floppy disk 21 inserted has a storage capacity of 2 MB, the movable contact of the detection switch 23A fits in the 2 MB indication hole 22A, so that the detection switch 23A is not activated. Thus, the detection switch 23A holds the off state and the 2 MB detection signal $S_{2M}$ which is outputted from the detection switch 23A is maintained at a high logic level.

At this event, the detection switch 23B is turned on since the disk casing 21C is not provided with any 4 MB indication hole 22B, and thereby the 4 MB detection signal $S_{4M}$ falls to a low logic level.

Thus, the control circuit 27 detects the 2 MB detection signal $S_{2M}$ at the high logic level and the 4 MB detection signal $S_{4M}$ at the low logic level and thereby detects that the floppy disk 21 is a 2 MB medium.

At the same time, the 2 MB detection signal $S_{2M}$ of the high logic level and the 4 MB detection signal $S_{4M}$ of the low logic level are inputted to the inputs T1 and T2 of the NAND gate 25, which thus outputs the disk insertion signal $S_{IN}$ of a high logic level to the control circuit 27. According to the disk insertion signal $S_{IN}$ the control circuit 27 detects the insertion of the floppy disk 21 and thereby starts the drive unit to drive the floppy disk 21.

When the floppy disk 21 inserted has a storage capacity of 4 MB, the detection switch 23A is turned on by the disk casing 21C which is provided with only the 4 MB indication hole 22B, so that the 2 MB detection signal $S_{2M}$ falls from the high logic level to the low logic level. In this event, the movable contact of the detection switch 23B fits in the 4 MB indication hole 22B, and hence the detection switch 23B is not activated, thereby maintaining the 4MB detection signal $S_{4M}$ at the high logic level.

According to the 2MB detection signal $S_{2M}$ of low logic level and the 4MB detection signal $S_{4M}$ of high logic level, the control circuit 27 detects that the floppy disk 21 is a 4MB medium. At the same time, the 2MB detection signal $S_{2M}$ and the 4MB detection signal $S_{4M}$ are inputted to the inverting inputs T1 and T2 of the NAND gate 25, which thus outputs a disk insertion signal $S_{IN}$ of a high logic level to the control circuit 27. According to the disk insertion signal $S_{IN}$ the control circuit 27 detects that the floppy disk 21 is inserted and thereby starts the drive unit 20 to drive the floppy disk.

In the drive unit 20, at least one of the storage capacity detection switches 23A and 23B turns on when the floppy disk 21 is placed in the drive unit 20. As a result, the NAND gate 25 detects that at least one of the storage capacity detection signals $S_{2M}$ and $S_{4M}$ changes in signal level, and thereby the insertion of the floppy disk 21 is detected.

The drive unit 20 detects the insertion of the floppy disk 21 according to storage capacity detection signals $S_{2M}$ and $S_{4M}$ which indicate the storage capacity of the floppy disk 21. Thus, the insertion of the floppy disk 21 is detected without the need for a switch that is exclusively for detecting disk insertion. With this construction, the drive unit 20 is fairly simplified.

In the embodiment, the NAND gate 25 is provided as a disk insertion signal generating unit but the present invention is not limited to this logic circuit. The disk insertion signal generating unit may include various logic circuits depending on types of the storage capacity detection switches 23A and 23B and connections of the power supplies $V_{CC1}$ and $V_{CC2}$.

Although in the embodiment the disk drive is switched according to three kinds of floppy disks 21, i.e. 1MB, 2MB and 4MB floppy disks, the present invention is not limited to these disks. The present invention may be applied to disk drive units which are switchable to correspond to more than three kinds of floppy disks. In this case, a logic circuit which has inputs corresponding in number to storage capacity detection holes of floppy disks may be used.

Make-contact type switches are used as the storage capacity detection switches 23A and 23B but other various detection units such as a photosensor, may be adopted. To correspond to these detection units, any suitable indication device may be provided to floppy disks instead of the storage capacity indication hole 22.

Although the drive unit 20 uses the floppy disk 21 as the recording medium, the present invention may be applied to conventional disk drive units using various magnetic disks.

The present invention may be applied to various disk drive units, such as the optical disk drive which drives optical disks, other than the drive unit 20 using magnetic disks.

What is claimed is:

1. A disk drive apparatus for receiving a disk cartridge that can be one of at least three types of disk cartridge, the types of disk cartridge including a first type of disk cartridge containing a disk having a first storage capacity, the disk cartridge having a first indication portion at a first position thereon; a second type of disk cartridge containing a disk having a second storage capacity, the disk cartridge having a second indication portion at a second position thereon, the second position being different from the first position; and a third type of disk cartridge containing a disk having a third storage capacity, the apparatus comprising:

guiding means for guiding the disk cartridge to an insertion position within the disk drive apparatus;

first detection means for detecting the first indication portion when the disk cartridge is inserted into the disk drive apparatus, the first detection means being located in a position corresponding to the first indication portion of the first type of disk cartridge when the disk cartridge is in the insertion position;

second detection means for detecting the second indication portion when the disk cartridge is inserted into the disk drive apparatus, the second detection means being located in a position corresponding to the second indication portion of the second type of disk cartridge when the disk cartridge is in the insertion position; and insertion detection means, responsive to the first detection means and the second detection means, for detecting when the disk cartridge in the insertion position.

2. A disk drive apparatus for receiving a disk cartridge that can be one of at least three types of disk cartridge the types of disk cartridge including a first type of disk cartridge containing a disk having a first storage capacity, the disc cartridge having a first indication hole at a first position therein; a second type of disk cartridge containing a disk having a second storage capacity, the disk cartridge having a second indication hole at a second position therein, the second position being different from the first position; and a third type of disk cartridge containing a disk having a third storage capacity, the disk cartridge having neither an indication hole at the first position nor an indication hole at the second position, the apparatus comprising:

- guiding means for guiding the disk cartridge to an insertion position within the disk drive apparatus;
- a first detection switch located in a position corresponding to the first indication hole of the first type of disk cartridge when the disk cartridge is in the insertion position in the disk drive apparatus, the first detection switch being activated when the disc cartridge is of the second type or of the third type;
- a second detection switch located in a position corresponding to the second indication hole of the second type of disk cartridge when the disk cartridge is in the insertion position in the disk drive apparatus, the second detection switch being activated when the disk cartridge is of the first type or of the third type; and
- control means for determining the type of the disk cartridge in response the first and the second switches and for determining that the disk cartridge is in the insertion position when at least one of the first and second detection switches is activated.

3. A disk drive apparatus as claimed in claim 2, wherein

- disk cartridges of the first type, the second type, and the third type each include a write protection indication hole, and
- the apparatus further comprises a write protect detecting means for detecting the write protection indication hole.

* * * * *